(12) United States Patent
Rabello

(10) Patent No.: US 8,256,379 B2
(45) Date of Patent: Sep. 4, 2012

(54) DOG LEASH ASSEMBLY WITH REMOVABLE CONTAINERS

(76) Inventor: Billy Pak Rabello, Carson, CA (US)

( * ) Notice: Subject to any disclaimer, the term of this patent is extended or adjusted under 35 U.S.C. 154(b) by 379 days.

(21) Appl. No.: 12/573,578

(22) Filed: Oct. 5, 2009

(65) Prior Publication Data

US 2010/0018468 A1 Jan. 28, 2010

Related U.S. Application Data

(63) Continuation-in-part of application No. 11/374,460, filed on Mar. 13, 2006, now abandoned, which is a continuation of application No. 10/691,892, filed on Oct. 23, 2003, now Pat. No. 7,044,080.

(51) Int. Cl.
*A01K 1/10* (2006.01)
(52) U.S. Cl. ............ 119/61.56; 119/51.5; 119/795
(58) Field of Classification Search ........... 119/51.5, 119/61.5, 61.56, 61.54, 795, 796, 51.01; 206/541, 223, 547, 549, 51; 383/901; D7/608
See application file for complete search history.

(56) References Cited

U.S. PATENT DOCUMENTS

| 2,326,414 | A | * | 8/1943 | Thompson | 220/4.27 |
| 3,703,816 | A | * | 11/1972 | Weathers | 62/457.4 |
| 4,444,324 | A | * | 4/1984 | Grenell | 215/6 |
| 5,105,768 | A | * | 4/1992 | Johnson | 119/61.56 |
| 5,752,464 | A | * | 5/1998 | King et al. | 119/63 |
| 5,823,136 | A | * | 10/1998 | Zarski | 119/61.56 |
| 5,947,056 | A | * | 9/1999 | Zarski | 119/61.56 |
| 6,443,096 | B1 | * | 9/2002 | Prydie | 119/61.56 |
| 7,263,949 | B1 | * | 9/2007 | Seaford | 119/51.5 |
| 2002/0083900 | A1 | * | 7/2002 | Williams | 119/51.01 |
| 2006/0219188 | A1 | * | 10/2006 | Beaupre | 119/795 |
| 2006/0272595 | A1 | * | 12/2006 | Edwards | 119/795 |

* cited by examiner

*Primary Examiner* — Kimberly Berona
(74) *Attorney, Agent, or Firm* — Marcia Devon; Devon & Associates

(57) ABSTRACT

A dog leash handle assembly is provided with containers for dog food and water which are removeably attached to the assembly. Thus, the dog owner has a single assembly including the leash and provisions for the dog which are readily transported. The assembly also provides a place for the storage of clean up bags and other items. The handle assembly further includes has a mechanism for attaching to the loop handle of a typical dog leash but may also be used with a retractable leash.

9 Claims, 5 Drawing Sheets

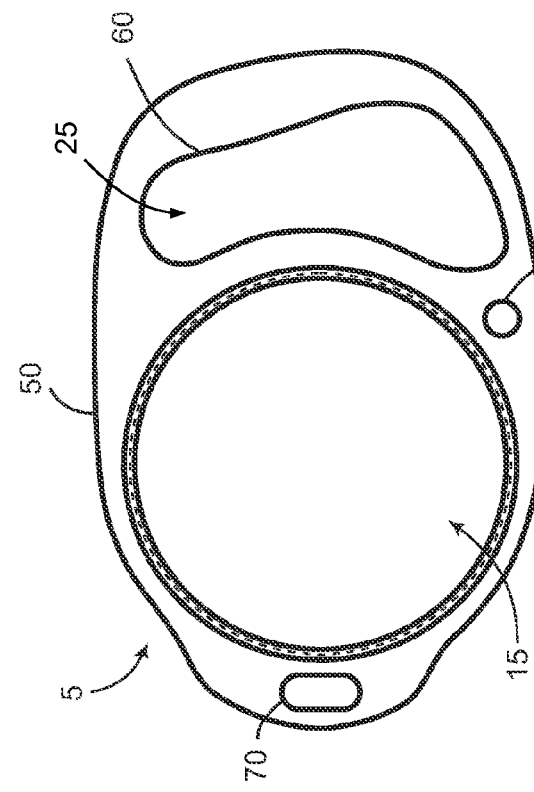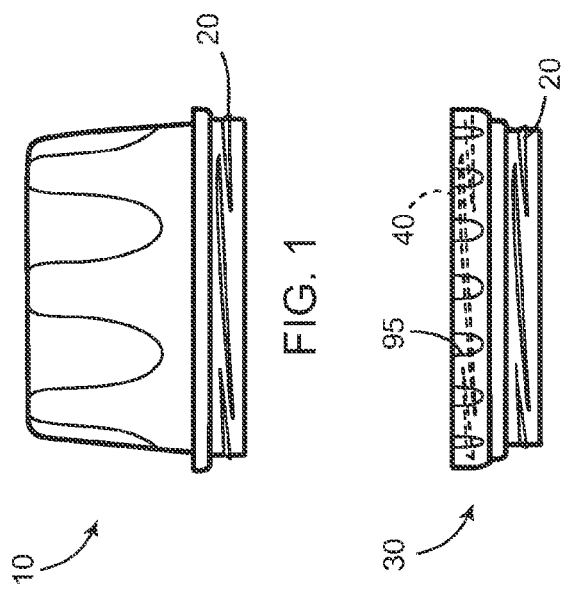

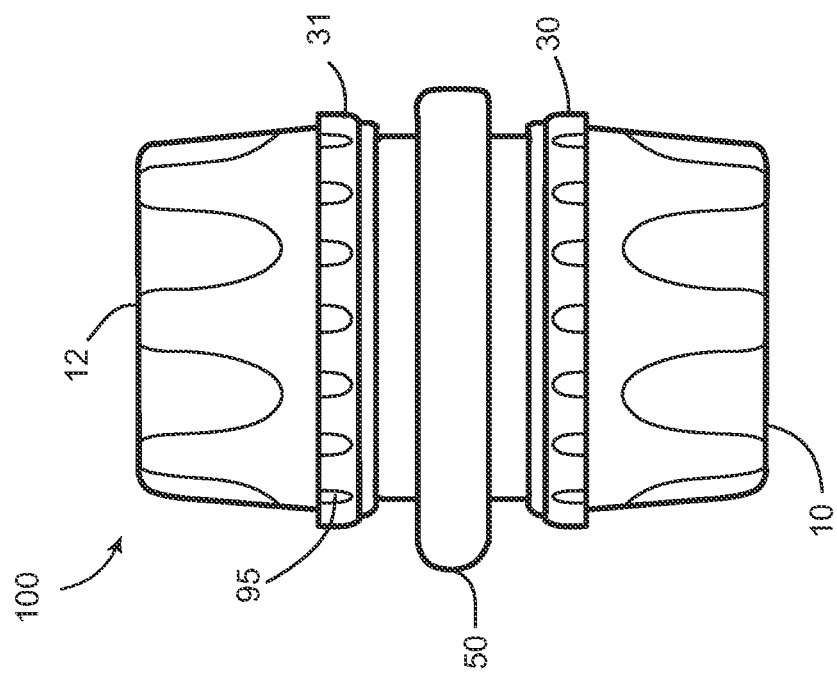
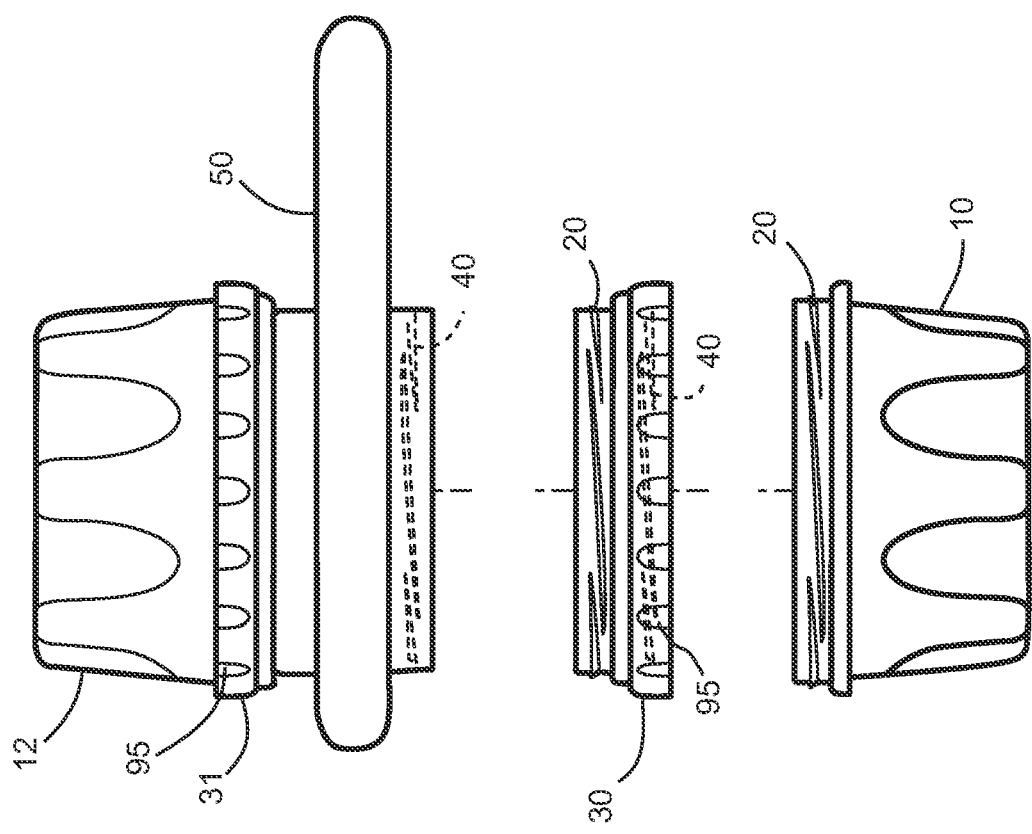

DOG LEASH ASSEMBLY WITH REMOVABLE CONTAINERS

CROSS-REFERENCE TO RELATED APPLICATIONS

The present application is Continuation-in-part of application Ser. No. 11/374,460 filed Mar. 13, 2006, now abandoned which is a Continuation of application Ser. No. 10/691,892 filed Oct. 23, 2003 which issued as U.S. Pat. No. 7,044,080. Both prior application are incorporated by reference to the present application

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of Invention

This invention pertains particularly to a dog leash assembly with removable containers and compartments for storage.

2. Background Information

The increasing popularity of dogs in urban population centers effectively requires pet owners to walk the pets in urban, public locations. Walking the dog is often the only exercise the pet and the owner are able to enjoy on a daily basis. The owner must carry a number of supplies during these walks to satisfy their needs as well as the needs of the dog, including the responsibility for the animal waste. Pet owners typically carry plastic waste disposal bags, keys, money, the dog leash and pet supplies such as water and food while walking with their dogs. Local ordinances often require that pet owners pick up the solid waste left by their pets. Pet owners typically use plastic bags to pick up the waste. The pet owner must remember to carry an ample supply of bags when they begin their walk. The ease, convenience and economy with which the waste may be handled in a clean and sanitary manner affect the willingness of pet owners to retrieve and properly dispose of their pet's waste.

Moreover, many owners would like to provide their dogs with some food and water, particularly during or after, longer walks or hikes. The owner must carry the food and water and the dishes necessary for dispensing the food.

Athletic ware and other comfortable walking clothes often have no pockets and there is reliable way to carry loose items such as money or keys other than carrying these items in their hands. The owner may also wish to carry additional items such as lip balm, a whistle and/or pepper spray greatly increases the burden on the owner. Therefore, there exists a need for a dog leash assembly which is compact and not much larger than a conventional dog leash holder, and will include storage compartments and removable containers with watertight lids. The containers may be used for storage, including food and water, and are removeably connected to the housing of the assembly. With the present invention, the dog owner may carry many of the afore-mentioned items and the dog leash with one hand.

Prior attempts at fulfilling the need for a dog leash assembly with feeding containers include the design disclosed in the Williams patent application US2002/083900 which was published on Jul. 4, 2002, but was never issued. Williams application is entitled and discloses a "portable pet-feeding container", while Applicant has disclosed a dog leash assembly including a hollow housing which is adapted to providing storage space and removable feeding containers for a pet. Williams may be optionally attached to a dog leash, but the leash attachment is incidental to the purpose of Williams which is a portable pet-feeding container.

Williams discloses openings in a single reservoir. The reservoir does not have compartments so that one must select either food or water to place in the reservoir. Applicant's design provides separate storage of food and water. The reservoir is formed within a skirt. The two halves of the bisected reservoir are folded into each other, pivoting at the hinge pin. The portable container is bulky compared to Applicant's compact design and is carried on shoulder harness. The feeding containers in Williams are not removable.

BRIEF SUMMARY OF THE INVENTION

The present invention is a dog leash handle assembly with removable containers which may be used for food and water for the dog, storage compartments and a means for providing waste bags. The dog leash assembly includes a hollow housing forming a handle for the owner to grasp and a mechanism for attaching the leash to the housing. The handle assembly may include an interior compartment capable of carrying keys, money and/or plastic waste bags. Containers with lids are removeably connected using various attachment mechanisms to the dog leash assembly through an opening in the housing, thereby providing the ability to provide food and water to the pet and the ability to readily refill the water container.

Plastic waste disposal bags can be stored in a compartment within a hollow portion in the handle assembly. The compartment can be filled with plastic bags detachably connected end to end or individual bags such as plastic grocery bags. Alternatively, a roll of plastic waste disposal bags may also be carried on the outside of the assembly which is releasably connected to the housing of the assembly. Keys and/or money and other items can be carried in the compartment.

Containers with removable lids are releasably affixed to the outer surface of the opening formed in the leash assembly. In the preferred embodiment, the lids are received and secured on the interior of the opening in the housing. The containers are preferably attached such that they are perpendicular to the plane of the housing to create a compact design. The containers may function as storage and serving dishes. The containers are adapted to allow the dog easy access to the food and water and permit rapid clean up. The contents of each container are held in place by the water tight but removable lids.

Utilizing the present invention, the owner can now carry a number of items, including food and water, with the leash. The storage compartments and detachable containers provide the owner with a reliable transportation device freeing them from the need to juggle several items during their walk.

The foregoing has outlined the more pertinent and important features of the present invention. Additional features of the present invention will be described hereinafter, which form the subject of the claims. It should be appreciated by those skilled in the art that the disclosed specific embodiment might be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

The invention will be more fully understood by reference to the following drawings that are for illustrative purposes only:

FIG. 1 is a side elevation view of a food or water container of the invention;

FIG. 2 is a side elevation view of a dividing spacer;

FIG. 3 is a side elevation view of a container assembly consisting of a dividing spacer attached to a food or water container;

FIG. 4 is a plan view of a holder;

FIG. 5 is a side elevation view of the holder;

FIG. 9 is an exploded elevational view of the containers and the housing;

FIG. 10 is an elevational view of the containers and the housing when the containers are in their attached position;

DETAILED DESCRIPTION

Figure 8:
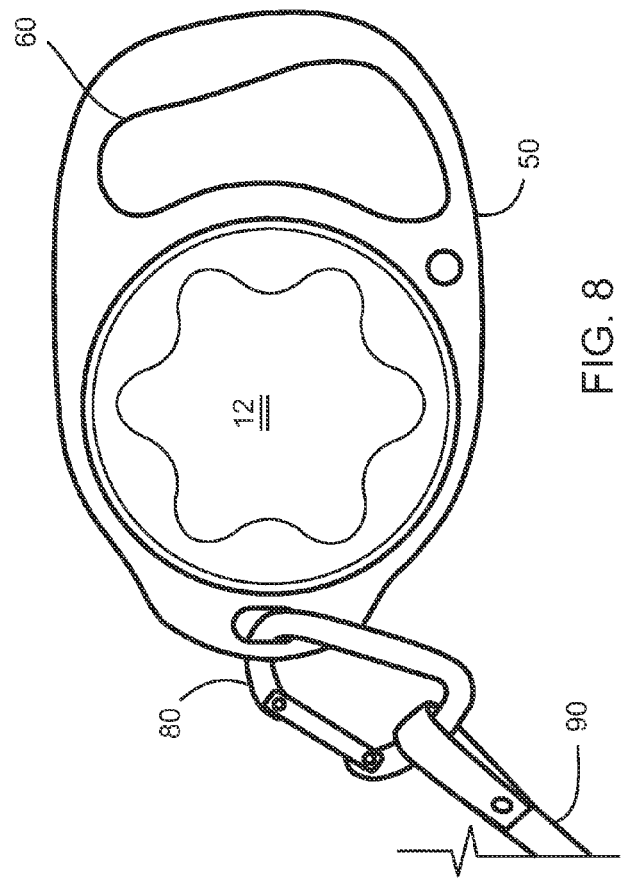
FIG. 8 is a cut-away perspective view with the containers not shown.

A dog leash handle assembly 5 is disclosed in FIG. 4 and FIG. 8 which may be attached to, and used with, conventional dog leashes. The housing 50 is hollow and contains inside compartments suitable for carrying keys, money and/or plastic waste disposal bags. The dog leash handle assembly 5 may be connected to a variety of conventional dog leashes 90 by attachment mechanisms such as a carbiner 80 attaching to opening 70 as shown in FIG. 8 or looped around a fastener 128 formed on the exterior of the housing 50.

The housing 50 is formed with an opening 25 forming handgrip 60 and is advantageously shaped to fit the human hand. The housing 50 is also formed with an opening 15 which is generally circular in the preferred embodiment. In the preferred embodiment, the handle is co-planar with the opening.

The housing 50 is adapted at opening 15 to receive removable containers 10 and 12. The removable containers 10 and 12 make it possible to readily store, transport and serve food and water with the dog leash handle assembly. The containers are of a size and shape to (1) mount to conventionally-sized dog leash housing; (2) permit easy transportation by the owner while walking the dog and (3) to enable the dog to be able to eat and drink directly from the containers 10 and 12. A typical dish will hold approximately 3-5 ounces of water. As the dishes are removable, the dog owner will be able to readily refill the dish with water and to rinse out the dog food after the dog has finished eating. The containers 10 and 12 are advantageously connected such that they are perpendicular to the housing 50.

FIG. 4 depicts a plan view of the dog leash assembly 5 [without the food and water dishes] the leash or the leash attachment. The containers 10 and 12 are removeably attached to each other and the housing 50.

It will be appreciated that there are a variety of ways to attach the containers to each other and to the housing. In an embodiment shown in FIG. 3, FIG. 9 and FIG. 10, food and/or water container assembly 100 comprises two containers, an upper container 10 and a lower container 12 with dividing spacers 30 and 31. Dividing spacers 30 and 31 may also function as lids and are formed with male threads 20 and female threads 40. Each container is formed on the upper perimeter with male threads 20.

Figure 7:
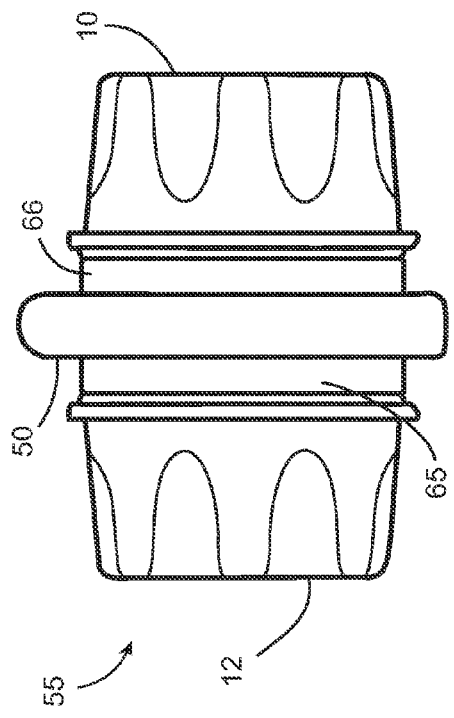
FIG. 7 is a side elevation view of the holder.
Figure 6:
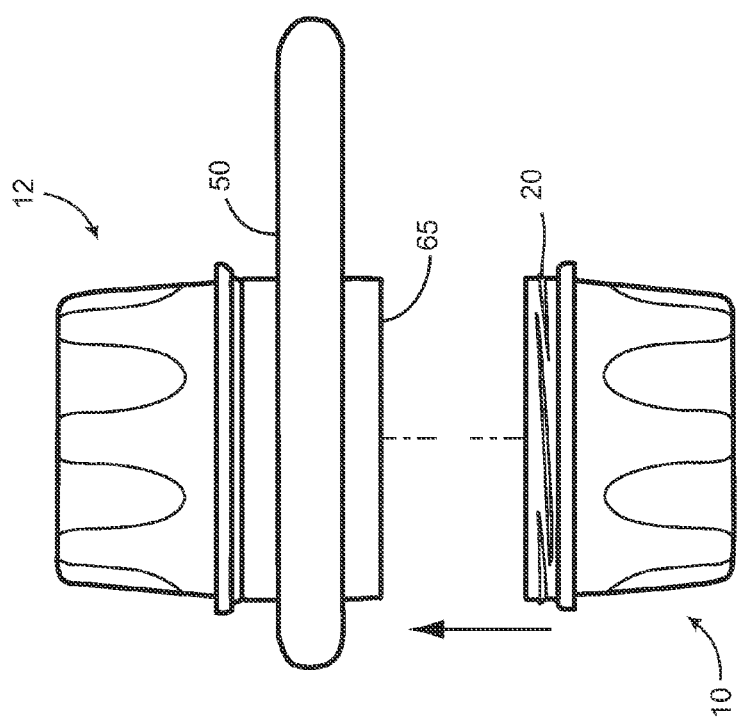
FIG. 6 is a partially exploded side elevation view of a pet food container assembly consisting of a holder of FIG. 4 and two food or water containers of FIG. 1 with a resealable lid.

In another preferred embodiment, shown in FIG. 6 and FIG. 7, the housing 50 is formed with protruding, threaded lips 65 and 66, on the distal and proximate ends of the opening 15. The food and water assembly 100 includes the upper and lower containers. The male threads of lower container 10 are engaged by female threads 40 formed in lip 65, while the upper container 12 is engaged by threads formed in lips 66 as shown in FIG. 6. The housing and the containers may advantageously be comprised of molded plastic. Indentions 95 are provided for the user's fingers to aid the assembly and disassembly of the food and water containers with the housing 50 of the leash assembly.

It will be appreciated by those skilled in the art that there are different ways to secure the containers through the opening in the housing to the housing. Instead of a threaded engagement, for example, the containers may be press-fit being held together by friction, although the containers may not be sealed as well.

Figure 11:
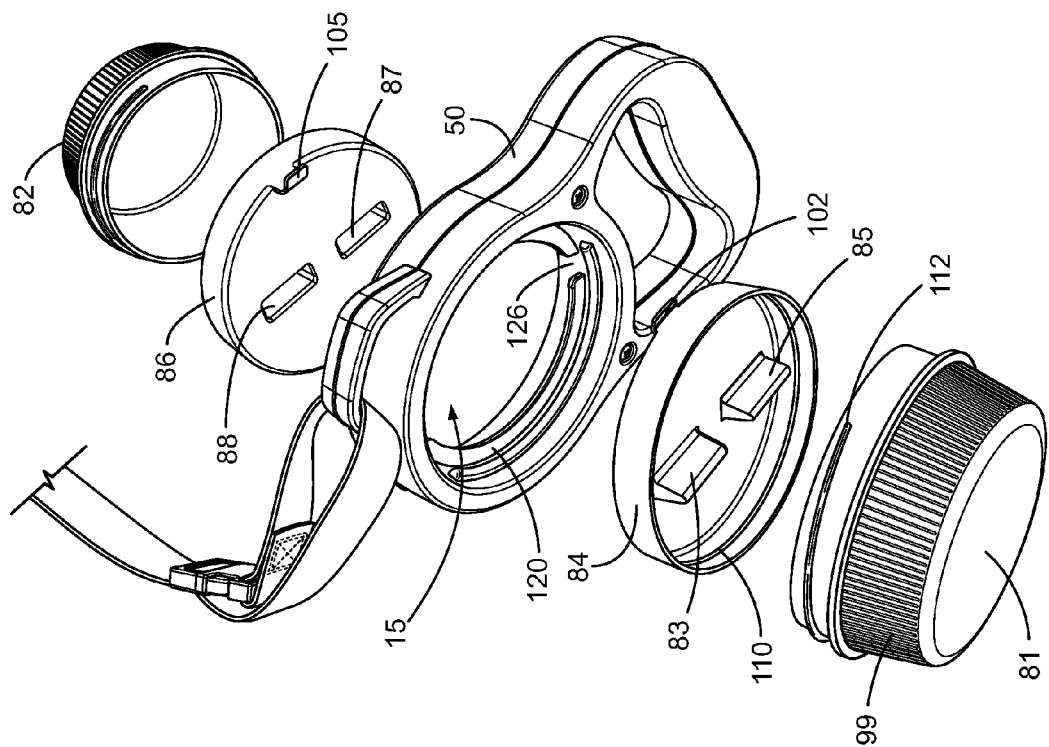
FIG. 11 is an exploded view of a preferred embodiment of the leash assembly of the present invention.
Figure 12:
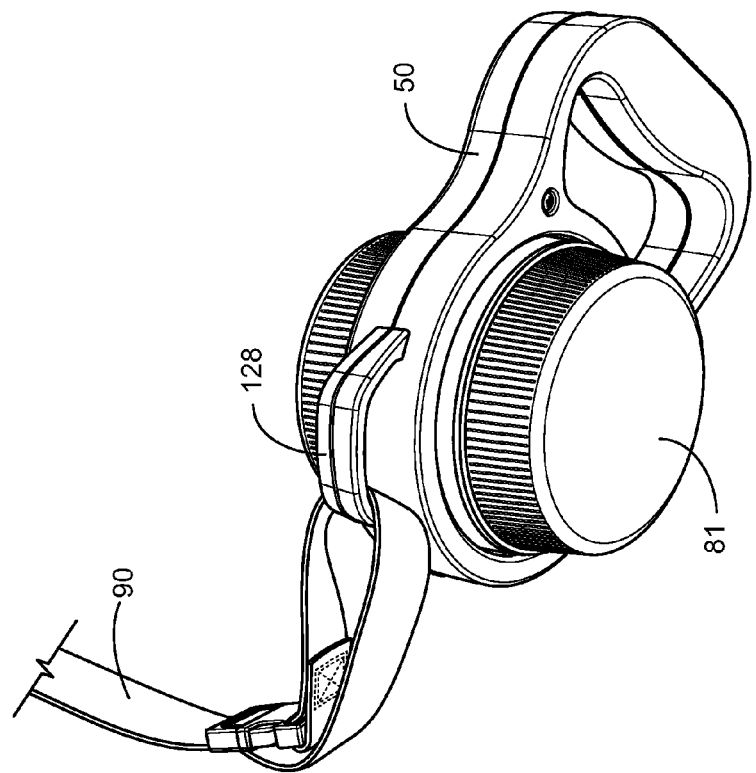
FIG. 12 is a perspective view of the preferred embodiment the leash assembly of the present invention.
Figure 13:
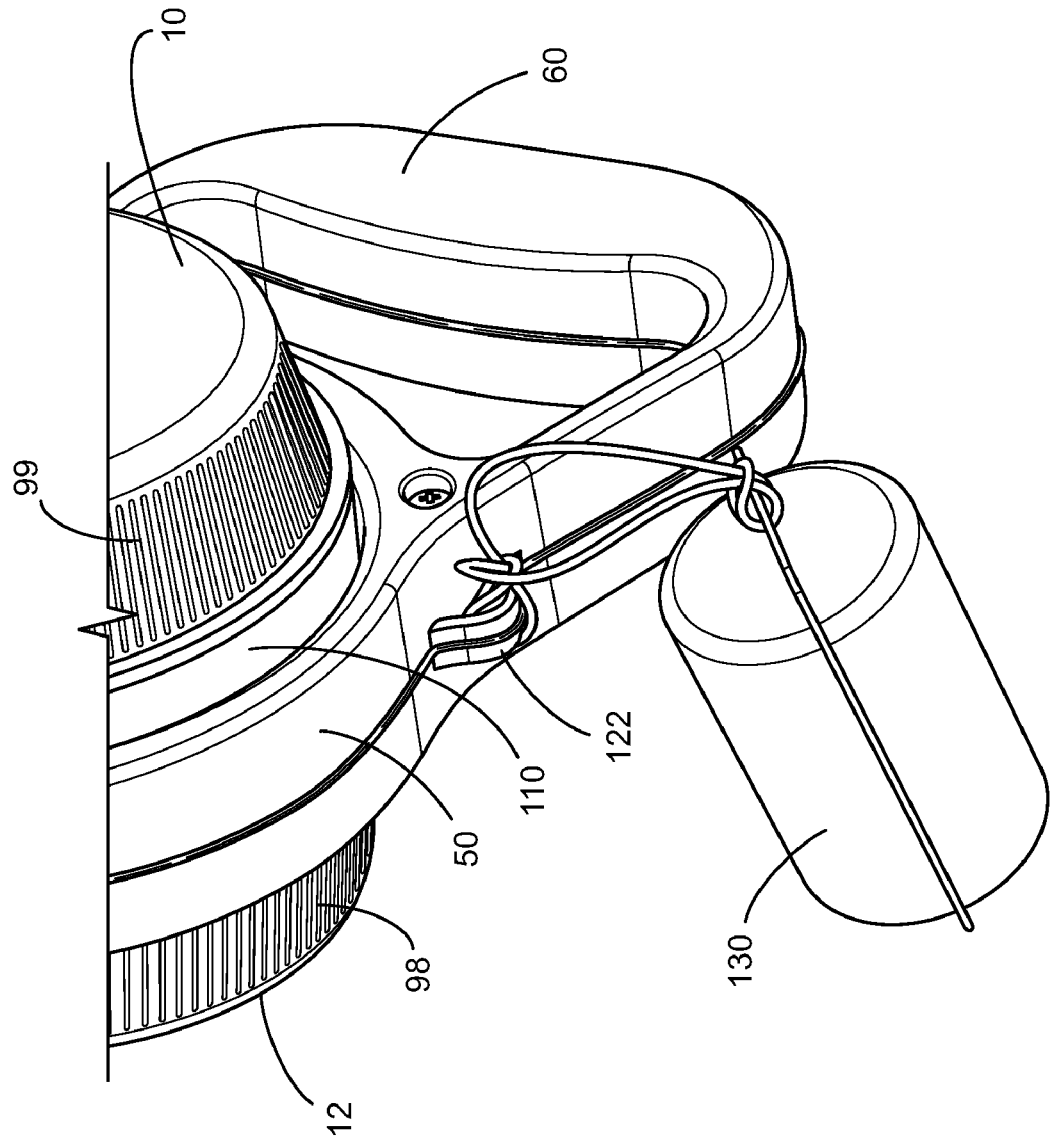
FIG. 13 is a cut away view of the present invention showing waste bags attached externally and removeably to the housing.

In the preferred embodiment shown in FIGS. 11-13, each container 81 and 82 has a water-tight lid 84 and 86, respectively. Arcuate grooves 120 are formed on the interior of the opening 15 of the housing 50. As illustrated in FIG. 11, Lid 84 is formed with female thread(s) 110 and lid 86 is also formed with female thread(s) [not shown]. Each lid is further formed with protruding tabs 102 and 105, respectively, adapted to engage the grooves 120 in the housing 50. The grooves may advantageously be discontinuous and the lids formed with opposing notches 126 so that the tabs may be inserted into the grooves. The lids 84 is then grasped by the user at hand grips 83 and 85 and inserted into notch 126. [The undersides 87 and 88 of the grips are illustrated in FIG. 11.] The user twists the lid, rotating the notch within the groove of the housing until the tab and the lid lock into place with the lid removeably attached to the housing 50. A similar procedure is followed with the lid 86 to secure lid 86 to the housing. The lids 84 and 86 are then removeably connected to their respective containers 81 and 82. The lids may be press or friction fit to the containers. Alternately, a male thread 112 or threads may be receive by female thread 110 formed inside the lids to provide a more secure connection between the containers and the lids. Each container is scored on the sides at 98 and 99 to assist the user in removing the containers from the housing.

In another preferred embodiment shown in FIG. 4, the hollow housing 50 includes an opening 109 to access an interior storage compartment (not shown) for placing plastic clean up bags for the pet and other personal items, e.g. keys. The compartment may be filled with plastic bags individual bags such as plastic grocery bags, for waste clean up. Alternatively, a bundle of bags 130 (FIG. 13) may be tied or otherwise detachably connected to a fastener 122 on the outside of the handle assembly.

In the preferred embodiment, which the hollow housing 50 include an opening 109 to access an interior storage compartment (not shown) for placing dog waste disposal bags for the pet and/or other personal items e.g. keys. The compartment can be filled with plastic bags detachably connected end-to-end or individual bags such as plastic grocery bags.

A retractable leash mechanism can replace leash attachment mechanism and is located inside the housing (not shown). The retractable leash mechanism has a biased reel 5 installed with its axel inside the housing 50.

The present disclosure includes that contained in the present claims as well as that of the foregoing description. Although this invention has been described in its preferred forms with a certain degree of particularity, it is understood that the present disclosure of the preferred forms has been made only by way of example and numerous changes in the details of construction and combination and arrangement of parts may be resorted to without departing from the spirit and scope of the invention. Accordingly, the scope of the invention should be determined not only by the embodiments illustrated, but by the appended claims and their legal equivalents.

I claim:

1. A dog leash assembly, comprising:
a dog leash;
a housing having a longitudinal plane and being at least partially hollow;
a handle integrally formed with said housing in line with the longitudinal plane;
said housing including a leash attachment mechanism for removably joining the leash to said housing;
an opening formed within and through said housing;
a food and water assembly removably connected to said housing and attached perpendicular to the longitudinal plane of said housing, said food and water assembly including a first container having a first removable lid, said first lid formed with a first attachment mechanism for connection to said housing and a second container having a second removable lid, said second lid formed with a second attachment mechanism for connection to said housing and;
said first and second lids adapted to be releasably connected to said housing, said opening formed with a third and fourth attachment mechanism such that said first attachment mechanism is received and secured by said third attachment mechanism and said second attachment mechanism is received and secured by said fourth attachment mechanism;
said containers having an attached and detached position such that in the attached position, each container is attached to the respective lid and each lid is attached to said opening in said housing and in the detached position, said containers are removed from said respective lid such that the containers may be used to serve food and/or water.

2. The dog leash assembly of claim 1, wherein said third and fourth attachment mechanisms are grooves formed on the interior of said opening and said first and said second attachment mechanisms comprising tabs on the first and second lids for releasable engagement with said grooves.

3. The dog leash assembly of claim 1 wherein said third and fourth attachment mechanisms are protruding lips having threads on the distal and proximal ends of said opening, said first and said second attachment mechanisms comprising threads on the proximate end of said first and second lids such that the containers are removeably attached to said housing when said threads of said lips and said threads of said lids are engaged.

4. The dog leash assembly of claim 1-3 wherein said opening in said housing is circular.

5. The dog leash assembly as in any one of claims 1-3 wherein waste bags are removeably affixed to the exterior of said housing.

6. The dog leash assembly as in any one of claims 1-3, wherein the housing is hollow and forms an interior storage compartment therein, said housing including a second opening for access into said storage compartment.

7. The dog leash assembly of claim 1 wherein said attachment mechanism is a carabineer.

8. The dog leash assembly as in any one of claims 1-3 further including finger grips on at least one of said containers and said lids.

9. The dog leash assembly of claim 2 wherein said grooves are arcuate and discontinuous.

* * * * *